United States Patent [19]

Goldenberg et al.

[11] Patent Number: 4,956,759
[45] Date of Patent: Sep. 11, 1990

[54] ILLUMINATION SYSTEM FOR NON-IMAGING REFLECTIVE COLLECTOR

[75] Inventors: Jill F. Goldenberg, Pelham Manor, N.Y.; Roland Winston, Chicago, Ill.

[73] Assignee: North American Philips Corporation, New York, N.Y.

[21] Appl. No.: 292,593

[22] Filed: Dec. 30, 1988

[51] Int. Cl.$^5$ .............................................. F21V 7/00
[52] U.S. Cl. .................................... 362/297; 362/346; 362/347; 350/620
[58] Field of Search ............... 362/297, 298, 310, 341, 362/346, 347, 350, 296; 350/619, 620, 628; 353/120, 109

[56] References Cited

U.S. PATENT DOCUMENTS

| | | | |
|---|---|---|---|
| 4,037,943 | 7/1977 | Anzai | 350/620 |
| 4,097,125 | 6/1978 | Suzuki | 350/620 |
| 4,114,592 | 9/1978 | Winston | 350/628 |
| 4,230,095 | 10/1980 | Winston | 350/628 |
| 4,458,302 | 7/1984 | Shiba et al. | 362/298 |
| 4,473,865 | 9/1984 | Landa | 362/298 |
| 4,517,631 | 5/1985 | Mullins | 362/298 |

Primary Examiner—Ira S. Lazarus
Assistant Examiner—D. M. Cox
Attorney, Agent, or Firm—William L. Botjer

[57] ABSTRACT

A first concave mirror collects the light emitted by a light source in a first half space and forms a first image of the light source at a point proximate thereto. A second larger concave mirror opposite the first mirror forms second and third images from the respective source and first image. The second and third images are formed at the input aperture of a non-imaging reflector, which in turn emits the light uniformly through the output aperture thereof.

18 Claims, 2 Drawing Sheets

ILLUMINATION SYSTEM FOR NON-IMAGING REFLECTIVE COLLECTOR

BACKGROUND OF THE INVENTION

The present invention relates to an illumination system which images the arc of a light source into the input aperture of a non-imaging reflector, and more particularly to an illumination system for use in projection displays having a light valve in the form of a liquid crystal display illuminated by light emitted from the output aperture of the non-imaging reflector.

U.S. patent application Ser. No. 137,049, and a continuation-in-part thereof filed Dec. 9, 1988, which are hereby incorporated by reference, disclose an illumination system including a light source and a first concave mirror positioned to collect substantially all the luminous flux. emitted by the light source within a first half space and to reflect it toward a second opposite half space. The system further includes a non-imaging reflective collector having an input aperture positioned to receive substantially all of the light emitted by the light source in the second half space as well as substantially all the light reflected by the first concave mirror into the second half space.

The first concave mirror disclosed in application Ser. No. 137,049 is contiguous with the input aperture of the non-imaging reflective collector and reflects the luminous flux from the light source directly into the input aperture of the collector. Since the size of the modulation device is fixed and it is desired to keep the emission angle of the beam exiting the output aperture of the collector to a minimum, the input aperture will generally be relatively small. For example, for maximum emission angles $\theta x$, $\theta y$ of $\pm 15$ degrees in air, and a rectangular light valve with a 4:3 aspect ratio and a diagonal of 48 mm, the input aperture must have a diagonal of 12 mm. This calculation is more fully discussed in Ser. No. 137,049 and the continuation-in-part thereof.

SUMMARY OF THE INVENTION

It is the primary object of the invention, to eliminate the size constraints imposed on the light source while optimizing the efficiency of light collection and limiting the divergence of light emitted from the non-imaging reflector.

According to the invention, therefore, the first concave mirror is profiled to form a first image of the light source at a point proximate thereto. The system further includes a second concave mirror positioned to collect all the light emitted by the light source in the second half space as well as all the light reflected by the first concave mirror through the first image into the second half space. The second concave mirror is profiled to form a second image of the light source at a point remote therefrom and to form a third image at a point proximate to the second image, the third image being formed from the first image. The input aperture of the non-imaging reflector receives substantially all the light from the second and third images of the light source.

In the illumination system according to the invention, the light source does not suffer the size constraints imposed when the first concave mirror is contiguous with the input aperture of the non-imaging reflector and maximum collection efficiency and limited divergence from the non-imaging reflector are to be obtained. The output aperture of the first concave mirror may thus be considerably larger than the input aperture of the non-imaging reflector, so that it can readily accommodate the envelope of the available arc lamps and image same with good image quality, which results in maximum collection efficiency at the input aperture of the non-imaging reflector. The larger mirror also eliminates heating problems which arise when the envelope is accommodated too closely.

According to a preferred embodiment, the first and second mirrors are profiled so that the second and third images are accommodated by the input aperture of the non-imaging reflector.

The first concave mirror may be a spherical with the light source located proximate to the center of the curvature thereof. The second concave mirror may also be a spherical mirror having a center of curvature offset from the center of the curvature of the first concave mirror and toward the input aperture by a given distance. The second and third image are then focussed near a point approximately twice the given distance from the light source. Preferably, the light source, the centers of curvature, and all of the images lie substantially in a common plane.

According to a further preferred embodiment, the second concave mirror is an elliptical mirror having a first focus proximate to the light source and a second focus proximate to the input aperture of the non-imaging reflector. The first concave mirror may also be an elliptical mirror having a first focus at the light source and a second focus at the first image. Where both mirrors are elliptical their major axes are at least substantially coincident.

DETAILED DESCRIPTION OF THE PREFERRED EMBODIMENTS

Figure 1:
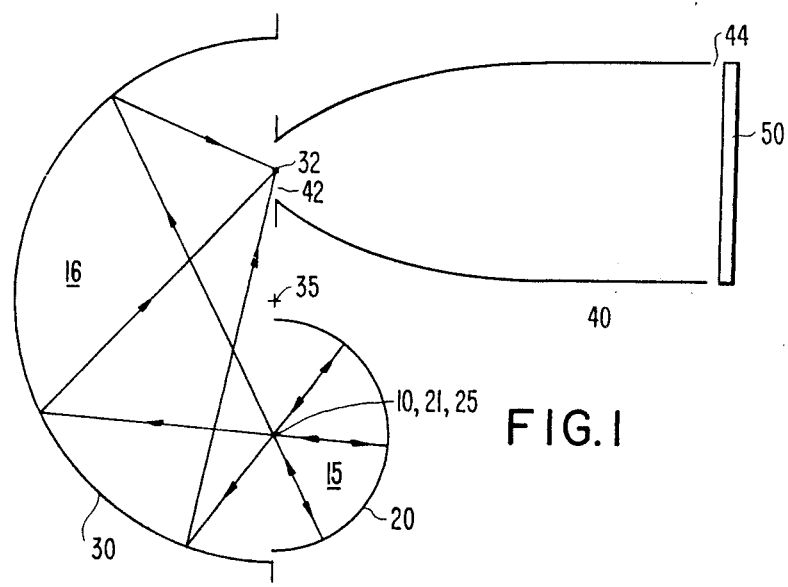
FIG. 1 is a schematic side section view which illustrates the principle of the invention.
Figure 2:
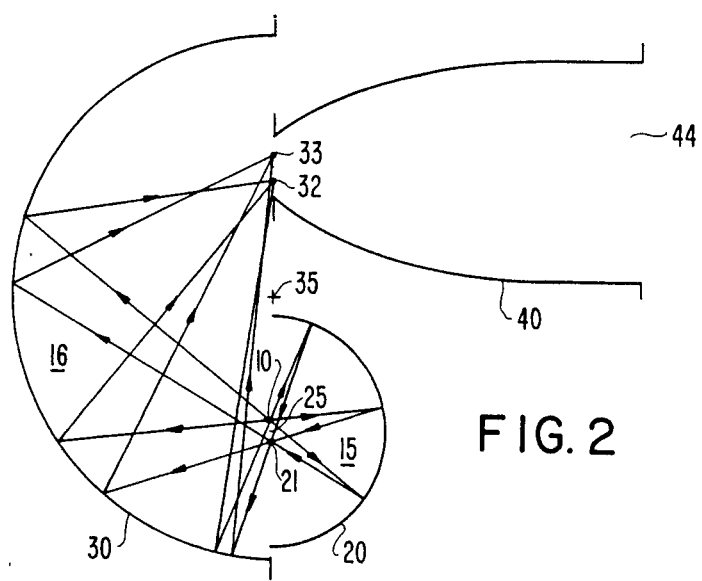
FIG. 2 is a schematic side section view of a practical embodiment using spherical mirrors.
Figure 3:
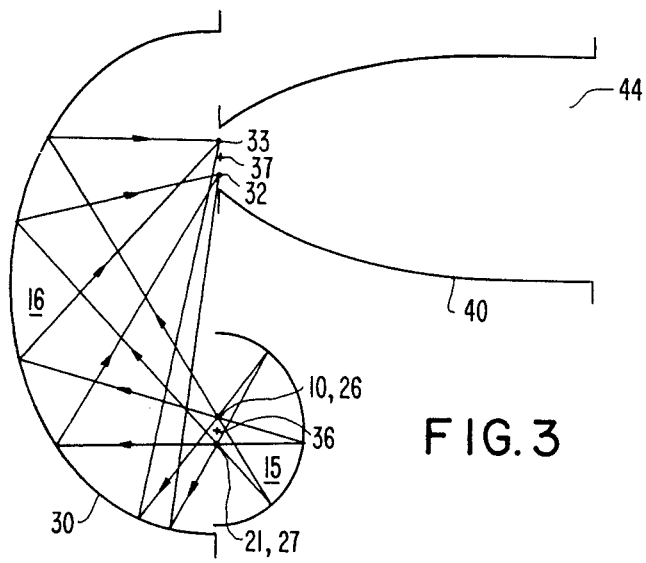
FIG. 3 is a schematic side section view of an embodiment using elliptical mirrors.

FIGS. 1-3 illustrate the evolution of the preferred embodiment of the illumination system. The system incorporates a light source 10, a first concave mirror 20, a second concave mirror 30 and a non-imaging reflector 40. Referring to FIG. 1, the first concave mirror 20 is spherical, the light source 10 being located at the center of curvature 25 thereof. The light source 10 emits luminous flux within a first half space 15 to form a first image 21 which is likewise at the center of curvature 25. The light source 10 also emits luminous flux in a second half space 16 and toward the second concave mirror 30 which is also spherical. The mirror 30 forms a second image 32 of the light source 10 at the input aperture 42 of non-imaging reflector 40, which collects the light for emission from output aperture 44 toward a modulating dence such as LCD 50. Note that the center of curvature 25 of the first mirror 20 as well as the second image 32 are both the same distance from the center of curvature 35 of the second mirror 30, and further that the images and centers of curvature are generally coplanar. The problem with the geometrically simple embodiment of FIG. 1, however, is that the first image 21 is coincident with the light source 10 and thus may not itself be fully imaged to the reflector 40; the light source 10 effectively absorbs some of its own light. It should be noted that there are light source which can be imaged through themselves, but these are not readily available.

Figure 4:
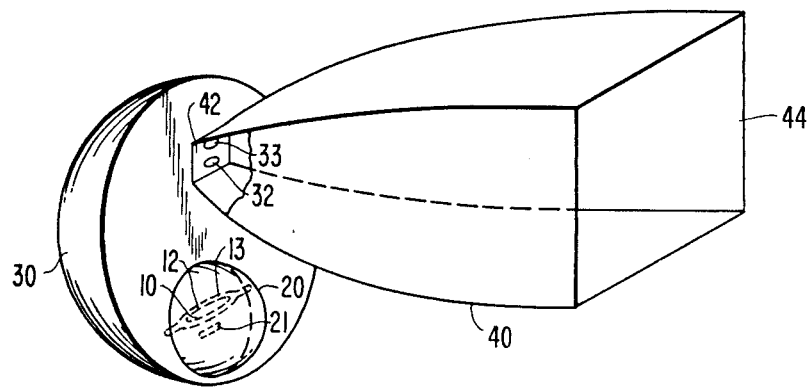
FIG. 4 is a schematic perspective of the illumination system and non-imaging reflector.

FIG. 2 again depicts first and second concave mirrors 20, 30 which are spherical in shape, but here the light source 10 is offset from the center of curvature 25 so that first image 21 is formed opposite the center of curvature 25 from the light source 10. Since the light source 10 will generally comprise an arc 12 surrounded by a cylindrical glass envelope 13 (FIG. 4), the spacing of the arc from the center of curvature 25 is slightly more than the radius of the envelope. The first image 21 is thus clear of the light source 10 and is itself imaged by the second mirror 30 to form a third image 33. Since the light source 10 and first image 21 are offset from the center of curvature 25, the second and third images 32, 33 are indistinctly formed in proportion to the degree of offset. However, the distinctness of the images 32, 33 is not especially important since the non-imaging reflector 40 is by definition not concerned with transmitting an image for efficiency it is only important that as much of the luminous flux as possible be transmitted form the light source 10 to the input aperture 42 of the reflector 40. The luminous flux (light) will in turn be transmitted from the output aperture 44 and through the modulator 50 within minimum deviation angles $\theta x$, $\theta y$ according to the teaching of U.S. application Ser. No. 137,049 and the continuation-in-part thereof.

The embodiment of FIG. 3 further improves the efficiency of the embodiment of FIG. 2 by utilizing concave mirrors 20, 30 which are elliptical in shape. The first concave mirror 20 has a first focus 26 and a second focus 27, while the second concave mirror 30 has a first focus 36 and a second focus 37. The light source 10 is placed at first focus 26 so that the first image 21 is formed at second focus 27. The foci 26, 27 are spaced on either side of focus 36 at a distance which is just sufficient for image 21 to be formed without interference from the lamp. Since the light source 10 and first image 21 thereof are both proximate first focus 36 of second mirror 30, they will be imaged thereby to the respective second and third images 32, 33. The images 32, 33 are proximate to the second focus 37 at the input aperture 42 of the non-imaging reflector 40. The major axes of the ellipses are at least substantially coincident, so that all foci 26, 27 36, 37 lie in a substantially common plane.

The foregoing is exemplary and not intended to limit the scope of the claims which follow.

What is claimed:

1. An illumination system comprising
   a light source,
   a first concave mirror positioned to collect substantially all of the luminous flux emitted within a first half space and to reflect it toward a second opposite half space, said first concave mirror being profiled to form a first image of said light source proximate to said light source,
   a second concave mirror positioned to collect all the light emitted by the light source within said second half space as well as all the light reflected by said first concave mirror through said first image into said second half space, said second concave mirror being profiled to form a second image of said light source at a point remote therefrom and to form a third image proximate to said second image, said third image being formed from said first image,
   a non-imaging reflector having an input aperture positioned to receive substantially all the light from said second and third images of said light source.

2. An illumination system as in claim 1, wherein said first and second concave mirrors are profiled so that said second and third images are accommodated by the input aperture of the non-imaging reflector.

3. An illumination system as in claim 1, wherein said first concave mirror is a spherical mirror having a center of curvature, said light source being located proximate to said center of curvature.

4. An illumination system as in claim 3, wherein said second concave mirror is a spherical mirror having a center of curvature offset from the center of curvature of said first mirror toward said input aperture by a given distance, whereby said second and third images are focussed near a point approximately twice said given distance from said light source.

5. An illumination system as in claim 4, wherein said light source, said centers of curvature, and all of said images lie substantially in a common plane.

6. An illumination system as in claim 1 wherein said second concave mirror is a spherical mirror.

7. An illumination system as in claim 1 wherein said second concave mirror is an elliptical mirror having a first focus proximate to said light source and a second focus proximate to said input aperture of said non-imaging reflector.

8. An illumination system as in claim 7 wherein said first concave mirror is an elliptical mirror having a first focus at said light source and a second focus at said first image, the major axes of the first and second concave mirrors being at least substantially coincident.

9. An illumination system as in claim 1 wherein said first concave mirror is an elliptical mirror having a focus proximate to said light source.

10. An illumination system of the type comprising a light source and a first concave mirror positioned to collect substantially all the luminous flux emitted by said light source within a first half space and to reflect it toward a second opposite half space, said system further comprising a non-imaging reflector having an input aperture positioned to receive substantially all of the light emitted by said light source in said second half space as well as substantially all the light reflected by said first concave mirror into said second half space, characterized in that
   said first concave mirror is profiled to form a first image of said light source at a point proximate thereto and in that said system further comprises a second concave mirror positioned to collect all the light emitted by the light source in the second half space as well as all the light reflected by said first concave mirror through said first image into said second half space, said second concave mirror being profiled to form a second image of said light source at a point remote therefrom and to form a third image at a point proximate to said second image, said third image being formed from said first image, said input aperture receiving substantially all the light from the second and third images of the light source.

11. An illumination system as in claim 1, characterized in that said first and second concave mirrors are profiled so that said second and third images are accommodated by the input aperture of the non-imaging reflector.

12. An illumination system as in claim 1, characterized in that said first concave mirror is a spherical mirror having a center of curvature, said light source being located proximate to said center of curvature.

13. An illumination system as in claim 3, characterized in that said second concave mirror is a spherical mirror having a center of curvature offset from the center of curvature of said first mirror toward said input aperture by a given distance, whereby said second and third images are focused near a point approximately twice said given distance from said light source.

14. An illumination system as in claim 4, characterized in that said light source, said centers of curvature, and all of said images lie substantially in a common plane.

15. An illumination system as in claim 1 characterized in that said second concave mirror is a spherical mirror.

16. An illumination system as in claim 1 characterized in that said second concave mirror is an elliptical mirror having a first focus proximate to said light source and a second focus proximate to said input aperture of said non-imaging reflector.

17. An illumination system as in claim 7 characterized in that said first concave mirror is an elliptical mirror having a first focus proximate to said light source and a second focus proximate to said first image, the major axes of the first and second concave mirrors being at least substantially coincident.

18. An illumination system as in claim 1 characterized in that said first concave mirror is an elliptical mirror having a focus proximate to said light source.

* * * * *